US011498240B2

United States Patent
Bjorkman et al.

(10) Patent No.: US 11,498,240 B2
(45) Date of Patent: Nov. 15, 2022

(54) DENSIFIED WOOD INCLUDING PROCESS FOR PREPARATION

(71) Applicant: AHF, LLC, Mountville, PA (US)

(72) Inventors: Travis E. Bjorkman, Lancaster, PA (US); Brian W. Beakler, York, PA (US); Luke P. Marra, Victoria, MN (US)

(73) Assignee: AHF, LLC, Mountville, PA (US)

( * ) Notice: Subject to any disclaimer, the term of this patent is extended or adjusted under 35 U.S.C. 154(b) by 0 days.

(21) Appl. No.: 17/315,480

(22) Filed: May 10, 2021

(65) Prior Publication Data
US 2021/0260791 A1 Aug. 26, 2021

Related U.S. Application Data

(63) Continuation of application No. 16/959,122, filed as application No. PCT/US2018/067849 on Dec. 28, 2018.

(60) Provisional application No. 62/611,953, filed on Dec. 29, 2017.

(51) Int. Cl.
B27N 3/08 (2006.01)
B32B 21/13 (2006.01)
B27K 5/00 (2006.01)
B27K 5/06 (2006.01)
B32B 21/04 (2006.01)
B32B 21/14 (2006.01)

(52) U.S. Cl.
CPC ............ B27K 5/007 (2013.01); B27K 5/001 (2013.01); B27K 5/06 (2013.01); B27N 3/08 (2013.01); B32B 21/042 (2013.01); B32B 21/13 (2013.01); B32B 21/14 (2013.01)

(58) Field of Classification Search
CPC ........ B27K 5/00; B27K 5/001; B27K 5/0085; B27K 5/06; B27N 3/00; B27N 3/08; B27N 3/086; B32B 21/042; B32B 21/13; B32B 21/14
See application file for complete search history.

(56) References Cited

U.S. PATENT DOCUMENTS 1,952,664 A 3/1934 Esselen
2,348,081 A 5/1944 Linzell
(Continued)

FOREIGN PATENT DOCUMENTS

CA 2100131 A1 1/1995
CA 2358452 A1 5/2001
(Continued)

OTHER PUBLICATIONS

International Search Report and Written Opinion of the International Searching Authority from PCT International Application No. PCT/US2018/067849, dated Mar. 4, 2019.
(Continued)

Primary Examiner — Linda L Gray
(74) Attorney, Agent, or Firm — Budzyn IP Law, LLC

(57) ABSTRACT

A wood substrate or member is included, having an increased density with respect to natural, untreated wood. The process includes drying the wood prior to application of heat and pressure, which are controlled to reduce or eliminate color change on a surface of the wood member where heat and pressure are applied.

12 Claims, 2 Drawing Sheets

(56) References Cited

U.S. PATENT DOCUMENTS

| | | | |
|---|---|---|---|
| 2,453,679 A * | 11/1948 | Stamm | B27M 1/02 |
| | | | 156/278 |
| 2,480,851 A | 9/1949 | Goss | |
| 2,666,463 A | 1/1954 | Heritage | |
| 3,231,455 A | 1/1966 | Campbell et al. | |
| 4,405,542 A | 9/1983 | Greer | |
| 4,606,388 A * | 8/1986 | Favot | B27M 1/02 |
| | | | 144/380 |
| 5,451,361 A | 9/1995 | Ruyter et al. | |
| 5,937,925 A | 8/1999 | Lee | |
| 5,992,043 A | 11/1999 | Guyonnet | |
| 6,083,437 A | 7/2000 | Nishio et al. | |
| 6,267,920 B1 | 7/2001 | Arakawa et al. | |
| 7,131,471 B2 | 11/2006 | McIntosh | |
| 7,258,761 B2 | 8/2007 | Liu et al. | |
| 7,404,422 B2 | 7/2008 | Kamke et al. | |
| 7,658,873 B2 | 2/2010 | Chen et al. | |
| 7,836,924 B2 | 11/2010 | Park et al. | |
| 8,153,038 B2 | 4/2012 | Tu et al. | |
| 8,221,660 B2 | 7/2012 | Tu et al. | |
| 8,221,894 B2 | 7/2012 | Dengyun et al. | |
| 8,555,521 B2 * | 10/2013 | Bies | B27K 5/001 |
| | | | 34/396 |
| 10,344,218 B2 | 7/2019 | Pagnozzi | |
| 2006/0278336 A1 | 12/2006 | Sundholm et al. | |
| 2008/0263890 A1 | 10/2008 | Picard | |
| 2010/0180987 A1 * | 7/2010 | Park | B27K 5/009 |
| | | | 144/380 |
| 2011/0052905 A1 | 3/2011 | Smith | |
| 2011/0262727 A1 | 10/2011 | Tu et al. | |
| 2016/0039113 A1 | 2/2016 | Bukowski et al. | |
| 2018/0238062 A1 | 8/2018 | Bjorkman et al. | |
| 2019/0329442 A1 | 10/2019 | Källander | |

FOREIGN PATENT DOCUMENTS

| | | | | |
|---|---|---|---|---|
| CN | 101214675 A | | 7/2008 | |
| CN | 101456195 A * | | 6/2009 | |
| CN | 100519116 | * | 7/2009 | C08H 8/00 |
| CN | 101966713 A | | 2/2011 | |
| CN | 101186045 A | | 5/2011 | |
| CN | 102107452 A | | 6/2011 | |
| CN | 102179854 A | | 9/2011 | |
| CN | 103753664 A | | 4/2014 | |
| CN | 103753664 B | | 8/2016 | |
| CN | 106113186 A | | 11/2016 | |
| CN | 106217566 A | | 12/2016 | |
| CN | 107414981 A | | 12/2017 | |
| CN | 108214729 A | | 6/2018 | |
| CN | 108344257 A | | 7/2018 | |
| CN | 108582356 A | | 9/2018 | |
| CN | 108582377 A | | 9/2018 | |
| CN | 108582378 A | | 9/2018 | |
| CN | 108638273 A | | 10/2018 | |
| CN | 108638277 A | | 10/2018 | |
| CN | 108673689 A | | 10/2018 | |
| CN | 106881756 B | | 12/2018 | |
| CN | 109176811 A | | 1/2019 | |
| CN | 109304781 A | | 2/2019 | |
| CN | 109366656 A | | 2/2019 | |
| CN | 109366670 A | | 2/2019 | |
| CN | 107234692 B | | 3/2019 | |
| CN | 108177209 B | | 3/2019 | |
| CN | 109434998 A | | 3/2019 | |
| CN | 109465932 A | | 3/2019 | |
| CN | 107322724 B | | 4/2019 | |
| CN | 109591122 A | | 4/2019 | |
| CN | 105965617 B | | 5/2019 | |
| CN | 109760166 A | | 5/2019 | |
| CN | 106584634 B | | 6/2019 | |
| CN | 110126044 A | | 8/2019 | |
| CN | 110281327 A | | 9/2019 | |
| CN | 107116627 B | | 10/2019 | |
| CN | 108943208 B | | 10/2019 | |
| CN | 110370404 A | | 10/2019 | |
| CN | 110625718 A | | 12/2019 | |
| DE | 3148120 C2 | | 4/1992 | |
| EP | 2255937 B1 | | 6/2015 | |
| FR | 3018714 B1 | | 12/2017 | |
| JP | H08238605 A | | 9/1996 | |
| JP | H09155813 A | | 6/1997 | |
| JP | H09155814 A | | 6/1997 | |
| JP | H09155815 A | | 6/1997 | |
| JP | H09155816 A | | 6/1997 | |
| JP | H09155817 A | | 6/1997 | |
| JP | H09155818 A | | 6/1997 | |
| JP | H09155819 A | | 6/1997 | |
| JP | H09267309 A | | 10/1997 | |
| JP | 3027828 B2 | | 4/2000 | |
| JP | 3032769 B2 | | 4/2000 | |
| JP | 3041344 B2 | | 5/2000 | |
| JP | 3103818 B2 | | 10/2000 | |
| JP | 3103819 B2 | | 10/2000 | |
| JP | 3103820 B2 | | 10/2000 | |
| JP | 3106140 B2 | | 11/2000 | |
| JP | 3131605 B2 | | 2/2001 | |
| JP | 3131606 B2 | | 2/2001 | |
| JP | 3153122 B2 | | 4/2001 | |
| JP | 3153123 B2 | | 4/2001 | |
| JP | 3153124 B2 | | 4/2001 | |
| JP | 3163351 B2 | | 5/2001 | |
| JP | 3624197 B2 | | 3/2005 | |
| JP | 3629813 B2 | | 3/2005 | |
| JP | 3992441 B2 | | 10/2007 | |
| JP | 4057947 B2 | | 3/2008 | |
| JP | 4221457 B2 | | 2/2009 | |
| JP | 5312154 B2 | | 10/2013 | |
| KR | 20180127864 A | | 11/2018 | |
| KR | 20180127871 A | | 11/2018 | |
| WO | 1994001259 A1 | | 1/1994 | |
| WO | WO-03013811 A2 * | | 2/2003 | B27N 3/04 |
| WO | 2014160938 A1 | | 10/2014 | |
| WO | 2016086657 A1 | | 6/2016 | |
| WO | 2019128197 A1 | | 7/2019 | |
| WO | 2019133806 A1 | | 7/2019 | |
| WO | 2020029507 A1 | | 2/2020 | |

OTHER PUBLICATIONS

Blomberg, et al., Effects of semi-isostatic densification of wood on the variation in strength properties with density, Wood science and Technology, Aug. 1, 2005.

Li, et al., "An Optimal Thermo-Hydro-Mechanical Densification (THM) Process for Densifying Balsam Fir Wood", Bioresources.com, 2013.

Welzbacher, et al., "Thermo-mechanical densification combined with thermal modification of Norway spruce (*Picea abies Karst*) in industrial scale—Dimensional stability and durability aspects", 66 Holz Roh Werkst 39-49, 2008 (published online: Sep. 9, 2007).

* cited by examiner

DENSIFIED WOOD INCLUDING PROCESS FOR PREPARATION

CROSS-REFERENCES TO RELATED APPLICATIONS

This application is a continuation of U.S. patent application Ser. No. 16/959,122, filed Jun. 29, 2020, which is a National Stage filing under 35 U.S.C. § 371 of PCT Application No. PCT/US2018/067849, filed Dec. 28, 2018, which claims priority to U.S. Provisional Application No. 62/611,953, filed Dec. 29, 2017, the entire contents of which are incorporated by reference herein.

BACKGROUND OF THE INVENTION

Field of the Invention

The invention includes a compressed wood member providing dimensional stability and not destroying or crushing the cellular structure of untreated wood. The process includes compression of wood after specific conditioning to increase the density of the wood member.

Summary of Related Art

There have been numerous attempts to improve properties of wood by increasing the density. Each of these processes focuses on maintaining or increasing the moisture content of the wood and/or are limited to veneer thicknesses.

U.S. Pat. No. 7,404,422 to Kamke et al. includes a process of increasing the temperature and moisture content of wood followed by mechanosorption, i.e., rapid movement of water out of the wood cell wall. The process is conducted with lower density veneers or composite panels.

Diouf et al. also describe a process for increasing the density of wood veneers in "Effects of thermo-hygro-mechanical densification on the surface characteristics of trembling aspen and hybrid poplar wood veneers." Applied Surface Science, vol. 257, issue 8, Feb. 1, 2011, p. 3558. The process uses thermo-hygro-mechanical densification, which includes the introduction of heat, steam and pressure to increase density. The article notes that a significant color change in the wood is observed above 200° C. (approx. 390° F.).

Arruda et al. describe another process for increasing wood density in "Utilization of a Thermomechanical Process to Enchance Properties of Hardwood Used for Flooring." Ciencia da Madeira, Brazillian Journal of Wood Science, vol. 6, no. 3, (2015). These processes were conducted on 30 mm×30 mm square wood samples having a thickness of 20 to 25 mm. There was no pre-treatment of the samples which are subjected to both heat and pressure. Before treatment, the samples had a before treatment moisture content of 9.49% to 12.48% and an after treatment moisture content of 5.36% to 9.36% depending on the sample.

SUMMARY OF THE INVENTION

One common feature of previous attempts to successfully increase the density of wood is the required introduction of water to increase and/or maintain a high moisture content in the wood prior to compression. The inventors have noted that as heat is applied in the prior processes, the water becomes steam, which is trapped in the porous structure of the wood. As the steam escapes, the cellular structure of the wood is damaged.

The issues of cellular structure damage and darkening of the wood surface have been resolved by the process provided herein. The result of this process is a treated wood member having a density about 10% to about 150% greater than untreated wood wherein the cellular structure of the wood is substantially intact. Furthermore, the treated wood member exhibits dimensional stability with a significant reduction or elimination of the darkening of the wood surface, which resulted from previous processes.

A process for preparing a treated wood member having an increased density includes: (a) providing a wood member having a moisture content less than about 19%; (b) preheating the wood member; (c) optionally, applying water to a surface of the wood member; (d) applying pressure to the wood member for a press time; and (e) providing a post-treatment conditioning of the wood member.

DETAILED DESCRIPTION OF THE INVENTION

Figure 1:
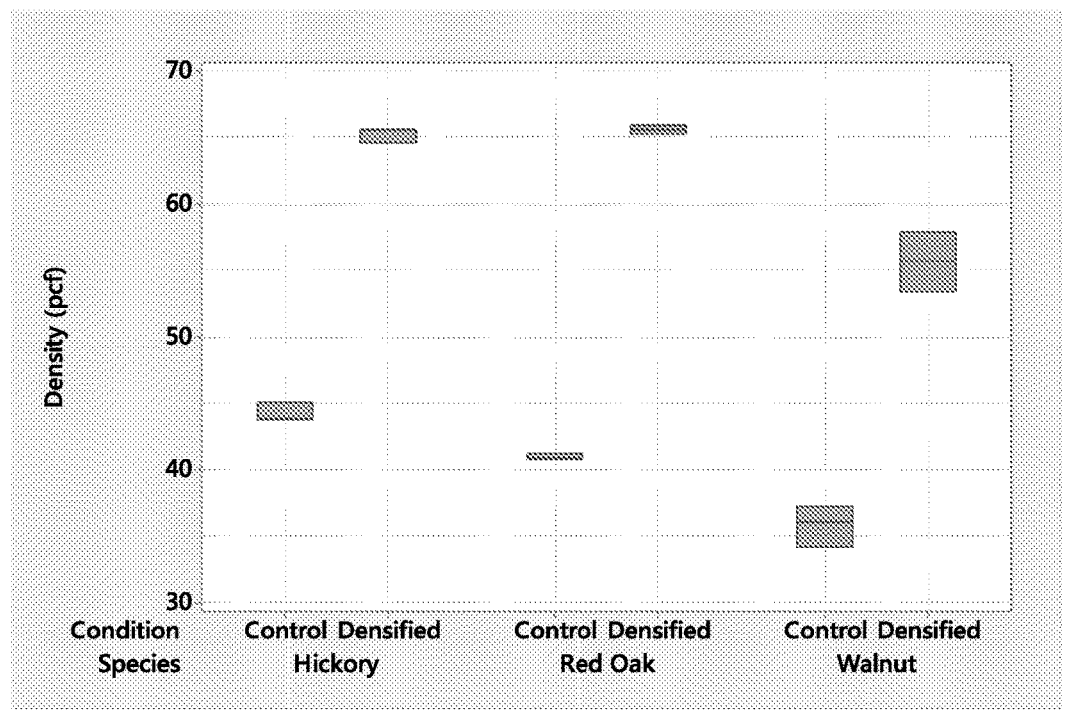
FIG. 1 is a chart showing comparison of density for similar species.

The process for preparing a treated wood member having an increased density is useful with a variety of different wood species. For example, the process may be used with either hardwood or softwood. However, the increase in density will depend on various factors including the original, untreated density of the wood, as well as other factors. Any of a variety of different wood species may be included. Suitable examples include, but are not limited to Red Oak, White Oak, Hickory, Walnut, Aspen, Basswood, Maple, Poplar, Pine, Cherry, and Ash.

The treated wood member will have advantages over untreated wood, such as an increased dimensional stability throughout a variety of temperature and humidity conditions, increased strength, and especially important for a flooring application, resistance to denting, which is a current drawback of existing wood floors.

The treated wood member will have advantages over untreated wood, including an increased dimensional stability throughout a variety of temperature and humidity conditions, increased strength, and/or increase resistance to denting. Susceptibility to denting and other physical deformation is a well-known drawback of wood products in almost any application, including, for example, flooring, construction, cabinetry, moldings, finishes, counter tops, furniture, walls, ceilings, decking. Tilus, the improved properties of the treated wood member of the present process make it useful for any application in which a wood surface is left exposed or is subject to physical insult.

When the treated wood is used in flooring, it may be used by itself, as a solid hard wood floor or as a component of flooring such as a veneer for engineered hardwood, laminate, or any other core material, such as plastic-based flooring substrates. The flooring may also include a tongue in groove, connection or a locking profile, many of which are known to those of skill in the art.

Depending on the species and type of wood being subjected to the present process, the increase in densification may be about 10% to about 150% greater than untreated wood. This includes an about 40% to about 100% comparative density increase. The density increase is typically uniform throughout the thickness of the wood. This can be observed by the vertical density profile. The density of the treated wood will typically be greater than 50 pcf (pound per cubic foot). Suitable densities may be about 50 pcf to about 85 pcf, or about 60 pcf to about 70 pcf.

The thickness of the treated wood will be less than the untreated wood. For example, the treated wood may have a thickness that is about 30% to about 70% less than untreated wood. The treated wood member may have a thickness greater than about 0.025 in, such as greater than about 0.25 in, including a range of about 0.5 in to about 8 in, and about 0.5 in to about 3 in. Various other suitable thicknesses may also be provided.

The color change of the top and bottom surfaces of the treated wood member may be significantly less than that seen with previous processes. For example, the surface color difference ($\Delta E$) of a treated wood member may be less than 20 compared to a surface color of untreated wood. In order to provide a minimal color change, the process/press temperature may be reduced to about 400° F.

Other benefits have been observed by the densification process. The present process reduces the bowing, cupping, and other lumber defects (e.g., distortion out of a flat plane) after the process is completed. The process has been observed to fuse knots that were loose prior to pressing. Also, after pressing the surface of the material is "smooth" compared to untreated material. Saw marks, rough fiber, and other surface imperfections are pressed smooth by the present process.

One significant difference between the current and previous processes is the pre-treatment of the wood to reduce the moisture content (MC). Previous attempts to increase density of wood did not reduce the MC of wood prior to compression.

The overall process includes (a) providing a wood member having a moisture content (MC) less than about 19%; (b) preheating; (c) optionally applying surface water; (d) applying pressure; and optionally cooling the treated wood member prior to (e) providing post-treatment conditioning.

Providing Reduced MC Wood Member (Initial Moisture Content of Wood)

The wood member to which the present treatment is applied has a reduced moisture content (MC) compared to green wood. The reduction in MC may be achieved by any suitable method such as treatment in a kiln. The MC of the wood member will be less than about 19% or less than about 15%. Suitable ranges include MC of about 3% to about 19%, about 5% to about 15%, about 5% to about 12%, and about 5% to about 10%.

Pre-Heating

The pre-heating step may also be conducted by any suitable method. The pre-heating step is included to increase the temperature of the wood throughout the thickness of the wood and may also result in a further MC reduction. The preheating may be conducted in any suitable temperature range including about 250° F. to about 500° F. The preheating should be applied for a sufficient time to obtain a core temperature of about 250° F. to about 500° F. The MC of the wood member may about 5% or less at the completion of the preheating, such as about 2% to about 5%.

Optional Water Application

Water may be applied to the surface only of the wood member, if desired. If used, the water may be applied in the form of liquid or steam. The addition of water may provide additional resistance and/or reduction of cupping and/or bowing in the wood member.

Applying Pressure

During the application of pressure, heat may also be applied to maintain the preheated core temperature of the wood member. The pressure may be applied by any known device such as a heated platen press, a continuous press, a series of mills, or a combination thereof. The pressing time may be about 10 seconds to about 60 minutes about 30 seconds to about 10 min. The pressure may be selected based on the species of wood and desired increase in density. Suitable ranges of pressures include about 500 psi to about 5000 psi, such as about 1500 psi to about 3500 psi. The pressing process may include a single press cycle or multiple press cycles. If desired, the wood member may be cooled after pressing.

Post-Treatment Conditioning

The post-treatment conditioning is important to maintaining the dimensional stability of the wood member. The post treatment may include the introduction of steam, humidity, heat, or combinations thereof. The post-treatment conditioning should raise the MC of the wood member. The MC may be that of any suitable construction material and may depend on the desired end use of the wood member. For example, the MC may be about 5 to about 10%, or about 7% to about 8%.

The features and advantages of the present invention are more fully shown by the following examples which are provided for purposes of illustration, and are not to be construed as limiting the invention in any way.

EXAMPLES

Color Change of the Material Appearance
  Conditions
  Control
  1.5 hour preheat at 375 F
  1.5 hour preheat at 475 F
  Control
  1.5 hour preheat at 375 F and 4 minute pressing 375 F and 3000 psi
  1.5 hour preheat at 425 F and 4 minute pressing 425 F and 3000 psi
  Three samples per board. Each group had untreated controls
  Three replicates per condition
  Measured the color change on both top and bottom face of the specimen using X-Rite Model SP64 Spectrometer $$\Delta E^*_{ab} = \sqrt{(L^*_2 - L^*_1)^2 + (a^*_2 - a^*_1)^2 + (b^*_2 - b^*_1)^2}$$

Material
  Red Oak
  Hickory
  13"×5.5" 4/4 Lumber

The color change table below indicates a greater color change for processing at 425 F, compared to 375 F.

| Color Change Table | | |
|---|---|---|
| Species and Conditions | Top-$\Delta E$ | Bottom-$\Delta E$ |
| HICKORY-Control No Preheat/No Press | | |
| HICKORY-Preheat/Press 375/375/4 min. | 3.645698 | 1.943353852 |
| HICKORY-Preheat/Press 425/425/4 min. | 9.478496 | 8.378549736 |

-continued

Color Change Table

| Species and Conditions | Top-ΔE | Bottom-ΔE |
|---|---|---|
| HICKORY-Control No Preheat/No Press | | |
| HICKORY-Preheat 375/No Press | 2.637723 | 2.668513909 |
| HICKORY-Preheat 425/No Press | 5.336167 | 5.013005495 |
| Red Oak-Control No Preheat/No Press | | |
| Red Oak-Preheat/Press 375/375/4 min. | 8.931624 | 6.42765546 |
| Red Oak-Preheat/Press 425/425/4 min. | 21.99234 | 21.15111906 |
| Red Oak-Control No Preheat/No Press | | |
| Red Oak-Preheat 375/No Press | 2.571813 | 4.201487458 |
| Red Oak-Preheat 425/No Press | 11.85161 | 7.752267843 |

Impact Resistance

Material

Red Oak, Walnut, Hickory and Basswood

15" ball drop with a mass of 16 ounces

Maximum depth measured with a Mitutoyo depth gauge 3 replicates per group 6 drops per replicate (specimen)

The table, below, indicates that a greater resistance to denting results from an increase in pressure, i.e., increase in density.

Impact Resistance Table

| Species | Pressure (psi) | Average Depth (inches) |
|---|---|---|
| Red Oak | Control | 0.01997 |
| Red Oak | 1,529 | 0.00683 |
| Red Oak | 2,038 | 0.00622 |
| Red Oak | 2,548 | 0.00406 |
| Red Oak | 3,058 | 0.00372 |
| Walnut | Control | 0.02525 |
| Walnut | 1,154 | 0.00813 |
| Walnut | 1,538 | 0.01363 |
| Walnut | 1,923 | 0.00654 |
| Hickory | Control | 0.01058 |
| Hickory | 1,529 | 0.00753 |
| Hickory | 2,038 | 0.00744 |
| Hickory | 2,548 | 0.00489 |
| Hickory | 3,058 | 0.00506 |
| Basswood | Control | 0.03781 |
| Basswood | 769 | 0.01044 |
| Basswood | 1,019 | 0.00719 |
| Basswood | 1,154 | 0.01531 |
| Basswood | 1,529 | 0.00686 |

FIG. 1 demonstrates the density increase (Mass/(Width, Length & Thickness)) for several treated samples and controls.

Environmental Chambers—4.6% EMC Conditions

Figure 2:
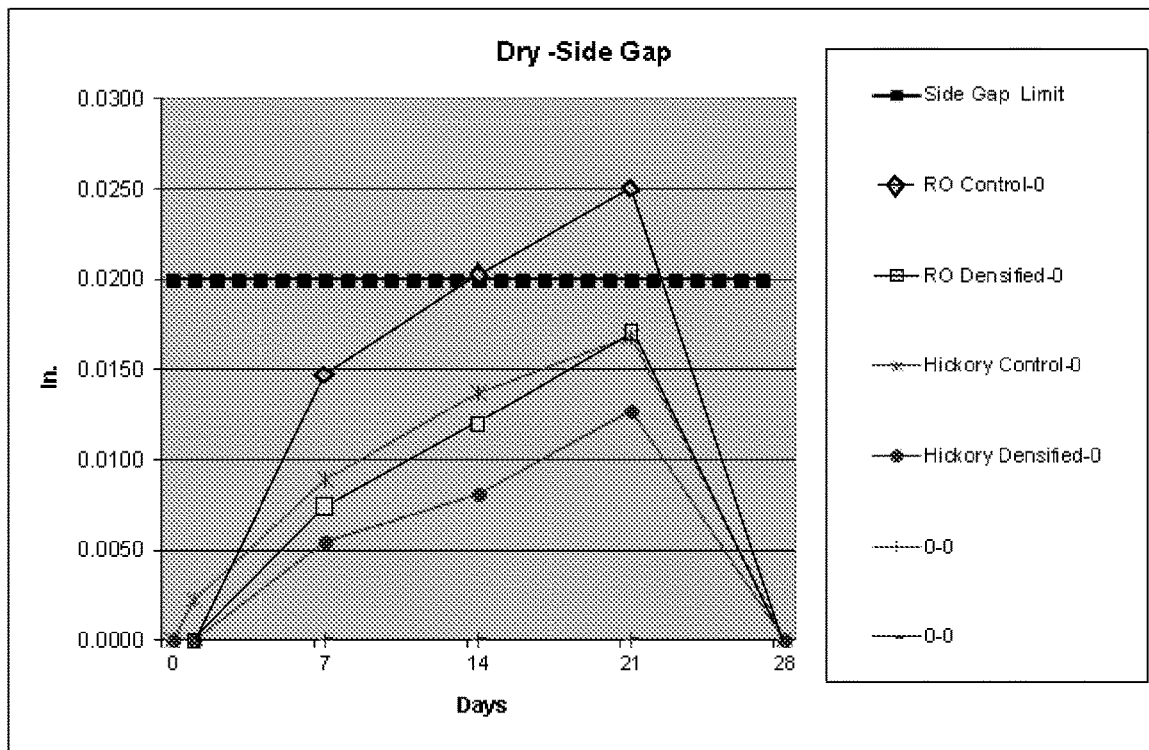
FIG. 2 is a chart showing the Dry Side Gap during the time after treatment.

Red Oak control and densified ⅝"×5"×RL material were machined and finished into finished flooring. This material was installed using mechanical fasteners to an already conditioned to 4.6 MC OSB subfloor in the environmental chamber. Measurements were taken using a set of feeler gauges at the side seams of joints of the flooring planks. This was completed initially, after 1 day, 7 day, 14 day and 21 day (28 day data is being collected today and tomorrow). The results can be seen in FIG. 2.

Vertical Density Profile (VDP)

Figure 3:
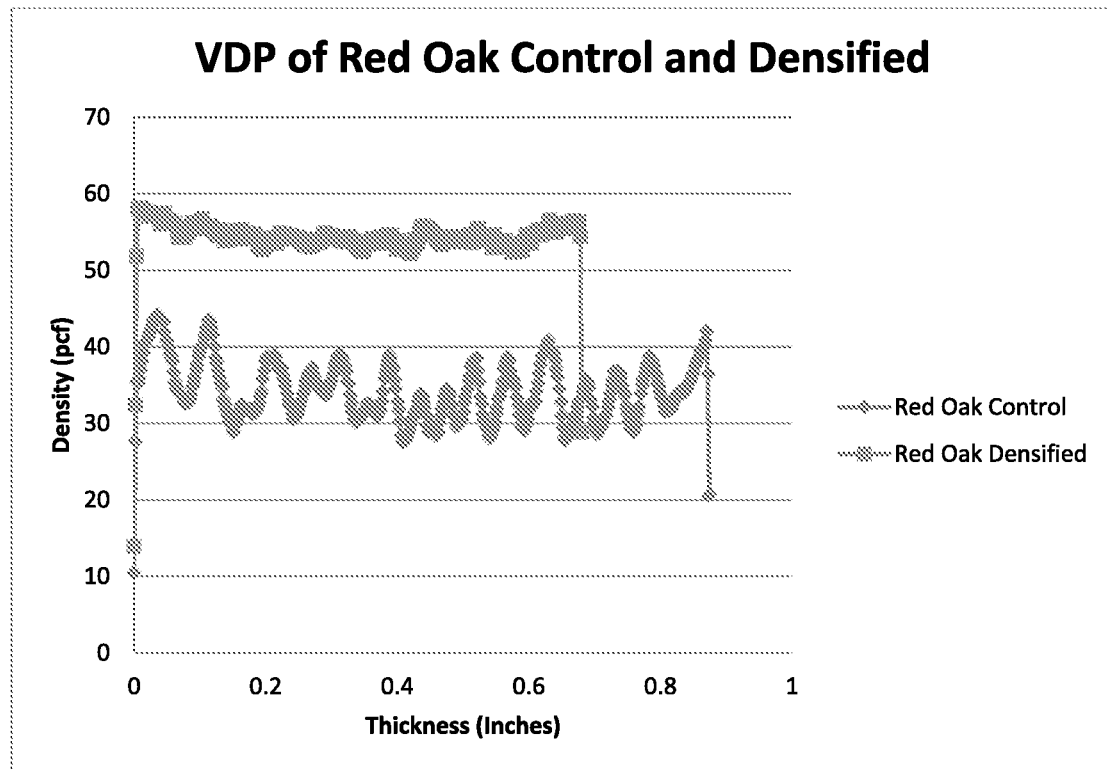
FIG. 3 is a chart demonstrating the vertical density profile.
Figure 3:
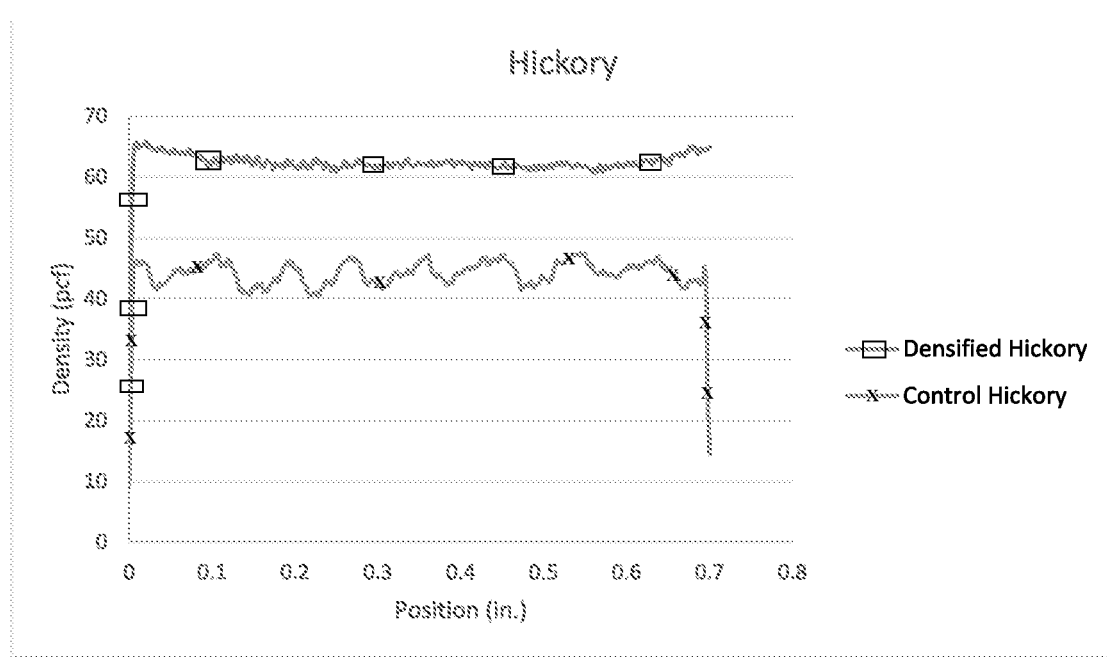

2"×2" specimens were measured for the density through the thickness using an X-Ray analyzer to measure density at 0.001" frequency through the thickness of the material. Quintek Measurement System Model QDP-01X was used for measuring VDP. FIG. 3 shows the reduction in variation in the VDP for Red Oak and Hickory.

Janka Testing

Resistance to denting was measure by a test commonly referred to as the Janka test. According to ASTM D143-14, the amount of force was measured as needed to embed a 0.444" steel ball to half of its diameter into a wood sample. The densified values represent the average of six sample and the control values represent the published values from the Wood Handbook. The Janka values in the table, below demonstrate that significantly more force was required to dent the densified samples.

| Wood Type | Janka Ball Value (lb-f) |
|---|---|
| Densified Hickory | 3687 |
| Densified Red Oak | 3228 |
| Brazilian Cherry-Control | 2350 |
| Mesquite-Control | 2345 |
| Hickory-Control | 1820 |
| Hard Maple-Control | 1450 |
| White Oak-Control | 1360 |
| Ash-Control | 1320 |
| Red Oak-Control | 1290 |
| Black Walnut-Control | 1010 |
| Black Cherry-Control | 950 |

While there have been described what are presently believed to be the preferred embodiments of the invention, those skilled in the art will realize that changes and modifications may be made thereto without departing from the spirit of the invention, and it is intended to include all such changes and modifications as fall within the true scope of the invention.

What is claimed is:

1. A method for increasing the density of a wood member including:
   (a) preheating a wood member by introducing the wood member to a temperature in a range of about 250° F. to about 500° F., wherein the preheating is for a time sufficient to reduce moisture content of the wood member to between 0 to about 2% 5% and to obtain a core temperature of the wood member of about 250° F. to about 500° F.;
   (b) after reducing the moisture content of the wood member to between 0 to about 2% and obtaining the core temperature of the wood member of about 250° F. to about 500° F., applying pressure to the wood member for a single press cycle for a press time of about 30 seconds to about 10 minutes, wherein heat is applied during the applying of pressure to maintain the core temperature during the applying of pressure in a range of about 250° F. to about 500° F.; and
   (c) providing a post-treatment conditioning of the wood member.

2. The method of claim 1, further comprising:
cooling the wood member before the post-treatment conditioning.

3. The method of claim 1, wherein the post-treatment conditioning includes the introduction of steam, humidity, heat or combinations thereof.

4. The method of claim 1, wherein the moisture content of the wood member prior to preheating is about 0 to about 19%.

5. The method of claim 1, wherein said pressure is about 500 psi to about 5,000 psi.

6. The method of claim 1, wherein the applying of pressure is conducted with a heated platen press, a continuous press, a series of mills, or a combination thereof.

7. The method of claim 1, further comprising reducing the moisture content of the wood member prior to preheating.

8. The method of claim 1, wherein the wood member is a hardwood.

9. The method of claim 8, wherein the hardwood is selected from the group including one or more of: red oak; white oak; hickory; walnut; aspen; basswood; maple; cherry; and, ash.

10. The method of claim 1, wherein the wood member is a softwood.

11. The method of claim 10, wherein the softwood is selected from the group including one or more of: poplar and pine.

12. The method of claim 1, wherein the heat is applied during the applying of pressure to maintain the core temperature during the applying of pressure in the range of about 250° F. to about 400° F.

\* \* \* \* \*

UNITED STATES PATENT AND TRADEMARK OFFICE
CERTIFICATE OF CORRECTION

| | | |
|---|---|---|
| PATENT NO. | : 11,498,240 B2 | Page 1 of 1 |
| APPLICATION NO. | : 17/315480 | |
| DATED | : November 15, 2022 | |
| INVENTOR(S) | : Travis E. Bjorkman, Brian W. Beakler and Luke P. Marra | |

It is certified that error appears in the above-identified patent and that said Letters Patent is hereby corrected as shown below:

In the Claims

Column 6, Line 54, "2% 5%" should read --2%--.

Signed and Sealed this
Twenty-seventh Day of December, 2022

*Katherine Kelly Vidal*
Katherine Kelly Vidal
*Director of the United States Patent and Trademark Office*